United States Patent [19]
Weston et al.

[11] Patent Number: 5,349,591
[45] Date of Patent: Sep. 20, 1994

[54] LASER PULSE STRETCHER AND COMPRESSOR WITH SINGLE PARAMETER WAVELENGTH TUNABILITY

[75] Inventors: Jeremy Weston, San Jose; William E. White, San Ramon, both of Calif.

[73] Assignee: Positive Light, Inc., Los Gatos, Calif.

[21] Appl. No.: 52,778

[22] Filed: Apr. 26, 1993

[51] Int. Cl.$^5$ ............................................. H01S 3/105
[52] U.S. Cl. ........................................ 372/25; 372/20
[58] Field of Search ...................... 372/20, 25, 102, 93; 359/154, 180

[56] References Cited

U.S. PATENT DOCUMENTS

| | | | |
|---|---|---|---|
| 4,928,316 | 5/1990 | Heritage et al. | 359/154 |
| 5,095,487 | 3/1992 | Meyerhofer et al. | 372/25 |
| 5,235,606 | 8/1993 | Mourou et al. | 372/25 |

*Primary Examiner*—Rodney B. Bovernick
*Assistant Examiner*—Robert McNutt
*Attorney, Agent, or Firm*—Greg T. Sueoka

[57] ABSTRACT

A dispersive laser pulse stretcher and compressor comprises a stretcher portion and a compressor portion. A first mirror, a second mirror, a third mirror, a first grating, a first lens, and a first vertical retroreflector block comprise the stretcher portion. A fourth mirror, a second grating, a horizontal retroreflector, and a second vertical retroreflector block preferably comprise the compressor portion. The input beams for the stretcher and compressor are preferably parallel beams. The present invention also positions the first grating of the stretcher in a parallel plane with the second grating of the compressor. The present invention also includes a method for simultaneously aligning the input angles of the stretcher and compressor, the method comprises the steps of: removing the first and second diffraction gratings; aligning the input beam for the stretcher portion; aligning the input beam for the compressor portion; mounting the first and second gratings on a mounting block in parallel planes, and rotating the mounting block until the proper input angle for the laser wavelength is reached.

10 Claims, 6 Drawing Sheets

LASER PULSE STRETCHER AND COMPRESSOR WITH SINGLE PARAMETER WAVELENGTH TUNABILITY

BACKGROUND OF THE INVENTION

1. Field of the Invention

The present invention relates generally to stretchers and compressors for lasers. In particular, the present invention relates to a dispersive laser pulse stretcher and compressor with single parameter wavelength tunability.

2. Description of the Related Art

Chirped Pulse Amplification (CPA) provides a technique for amplifying short laser pulses to previously unattainable intensities. This technique involves dispersively stretching a short laser pulse prior to amplification, thus decreasing the peak power of the laser pulse during amplification. After amplification, the stretched pulse is compressed in a dispersive compressor which provides extremely high peak intensities.

The CPA systems of the prior art employ a variety of stretchers and compressors. FIG. 1 illustrates a two grating pulse stretcher 10 of the prior art. As shown in FIG. 1, the beam enters the stretcher 10 and is reflected by a first mirror 12 to a first diffraction grating 18. The grating 18 passes the diffracted beam on through a first and a second lenses 22, 24 to the second diffraction grating 20. The diffracted beam is incident on grating 20 at the same angle (relative to the grating normal) that it left the first grating 18. The second grating 20 directs the beam to a first vertical retroreflector 14. The first vertical retroreflector 14 reflects the beam on a return path to the second grating 20, the second lens 24, the first lens 22, the first grating 18, and the first mirror 12. The beam is then output by reflecting the beam from the first mirror 12 at a different height than the input beam, allowing mirror 16 to reflect the beam out of the stretcher.

FIG. 2 illustrates another prior art pulse stretcher 26. The pulse stretcher 26 of FIG. 2 only employs a single grating. As shown, the beam enters the stretcher 10 and is reflected by a first mirror 12 to a first grating 18. The first grating 18 passes the diffracted beam on through a first lens 22 to a first vertical retroreflector 14. The first vertical retroreflector 14 reflects the beam back through the first lens 22 to the first grating 18. The symmetry provided by the vertical retroreflector 14 makes this optically identical to the stretcher 10 of FIG. 1. The return path of the beam is completed by traveling from the first grating 18 through the second vertical retroreflector block 28 to the output by way of the first and third mirrors 12, 16.

Similarly, single and dual grating pulse compressors have also been developed. FIG. 3 illustrates a two grating pulse compressor 30. The compressor 30 comprises a first and third mirrors 12, 16; a first vertical retroreflector 14; and a first and second gratings 18, 20. The stretched beam enters the compressor 30 and is reflected by the first mirror 12 to the first grating 18, then to the second grating 20 until the first vertical retroreflector 14 is reached. The beam approaches the second grating 20 at the same angle (relative to the grating normal) that it left from the first grating 18. The first vertical retroreflector 14 reflects the beam back to the second grating 20 and to the first grating 18. The returning beam is then reflected by the first mirror 12 and the third mirror 16 to the output.

A single grating pulse compressor 32 of the prior art is shown in FIG. 4. The single grating pulse compressor 32 comprises a first, second, third, and fourth mirrors 12, 15, 16 and 34; a first vertical retroreflector 14; and a first grating 18. The beam enters the compressor 32 and is reflected by the first mirror 12 to the grating 18. The beam leaves the grating 18 and returns to the grating 18 at the same angle it left with, after being reflected by the second and third mirrors 15, 16 at right angles to each other. The beam is then directed to the first vertical retroreflector 14. The beam returns from the first vertical retroreflector 14 and follows a path through the grating 18, to the third and second mirrors 16, 15, to the grating 18 and then to the first mirror 12. The compressed beam is then output after being reflected by the fourth mirror 34.

One continuing problem with the CPA systems of the prior art has been aligning the input of the stretcher and the input of the compressor. Various combinations of the stretchers and compressors described above can be used, but in order for stretching and compressing to work properly, the input angle of the beam into the stretcher must be adjusted to be precisely the same as the input angle of the beam into the compressor. The input angle can be adjusted by rotating the position of the gratings about their central axes. In systems using multiple gratings, the alignment of the input angles to the stretcher and compressor is very time consuming and laborious since the input angle for each grating must be modified to assure the proper alignment. For example, a typical alignment process for just the stretcher includes repeating the steps of: adjusting the position of the first grating for the stretcher, measuring the input angle to the first grating, modifying the input angle for the second grating, and measuring the input angle for the second grating. The process for measuring the input angle is very laborious and time consuming. It is not uncommon for these steps to be repeated numerous times to obtain the proper input angle just for the stretcher, and the alignment process often takes several hours. Once the stretcher has been aligned, then the compressor must be precisely aligned to have the same input angle. Aligning the compressor is performed in similar manner by repeating the steps of repositioning the gratings and then measuring the input angles. Similarly, the alignment process for the compressor can take several hours.

The significance of the problems involved in properly aligning the stretcher and compressor are heightened by the fact that the stretcher and compressor must be realigned every time a different wavelength pulse is stretched and compressed. Unfortunately, the grating angles for proper operation of CPA are different for different wavelengths. Therefore, each time the laser wavelength is changed, the alignment procedure must be performed for the stretcher and compressor to operate properly.

One prior art method for avoiding the problems associated with realigning the gratings is to make a stretcher and compressor with optical components, namely diffraction gratings, large enough to allow some degree of tunability without having to move them. This is presently not practical due to the technological limitations on the size of the diffraction gratings commercially available. Even using the largest diffraction gratings that are currently available, the grating size would continue to limit tunability. Moreover, even if larger diffraction gratings were able to provide the tunability desired, their cost would make any system including them prohibitively expensive.

Therefore, there is a need for a pulse stretcher and compressor that is very easy to adjust for correct operation of the CPA, or for changes in the wavelength of the laser begin amplified.

SUMMARY OF THE INVENTION

The present invention overcomes the limitations and shortcomings of the prior art with a combined stretcher and compressor. The combined stretcher and compressor of present invention advantageously includes a single grating stretcher portion and a single grating compressor portion. A first mirror, a second mirror, a third mirror, a first diffraction grating, a first lens, and a first vertical retroreflector comprise the stretcher portion. A fourth mirror, a second grating, a horizontal retroreflector, and a second vertical retroreflector preferably comprise the compressor portion. The present invention preferably arranges these components such that the input for stretcher and the input of compressor are parallel beams. The present invention also positions the first grating used for the stretcher in a parallel plane with the second grating used for the compressor with each grating facing in an opposite direction. The gratings are preferably mounted on the same rotatable block. By rotating the block, the input angle to both the stretcher and the compressor are changed by the same amount simultaneously. Any adjustments to the input angle for changes in the laser wavelength can be accommodated by changing a single parameter, namely, the angle of the grating block, and thus, the position of both gratings with respect to the input beams.

The present invention also includes a method for simultaneously aligning the input angle of the stretcher portion and the input angle of the compressor portion of the present invention for proper operation as a CPA. The preferred method preferably comprises the steps of: removing the first and second diffraction gratings; aligning the input beam for the stretcher portion such that it passes through a first and a second alignment holes; aligning the input beam for the compressor portion such that it passes through the first and second alignment holes; mounting the first and second gratings on a mounting block in parallel planes, and rotating the mounting block until the proper input angle for the laser wavelength is reached.

DETAILED DESCRIPTION OF THE PREFERRED EMBODIMENT

Figure 1:
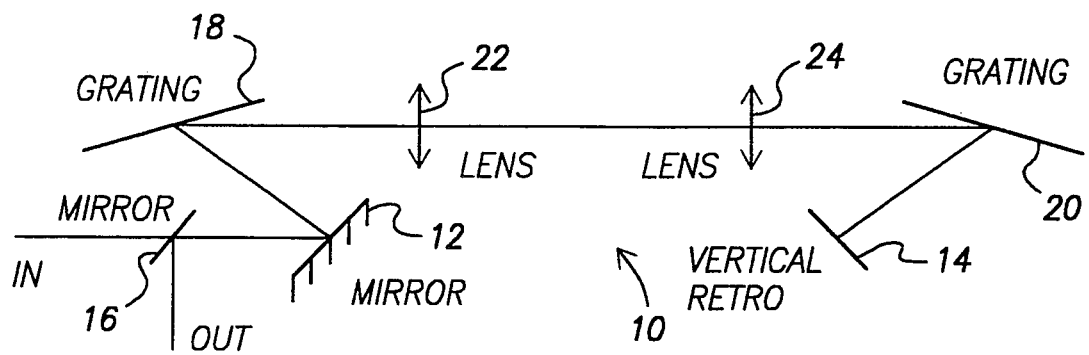
FIG. 1 is a schematic diagram of a two grating pulse stretcher of the prior art.
Figure 2:
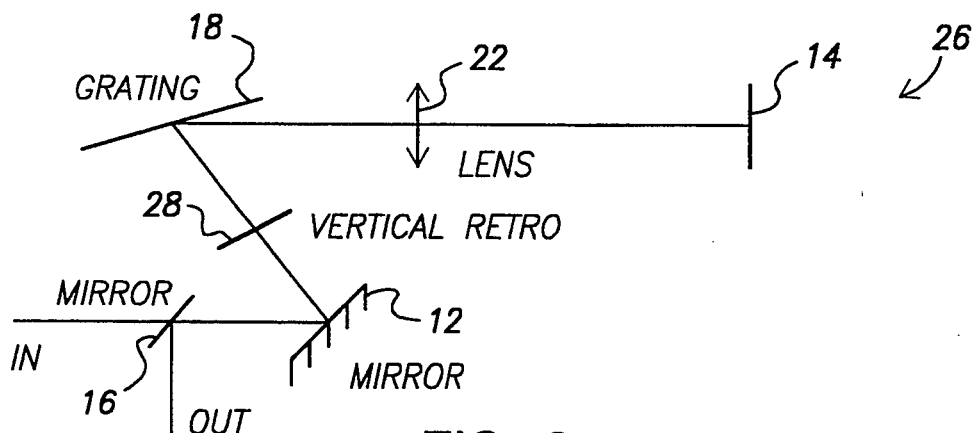
FIG. 2 is a schematic diagram of a single grating pulse stretcher of the prior art.
Figure 3:
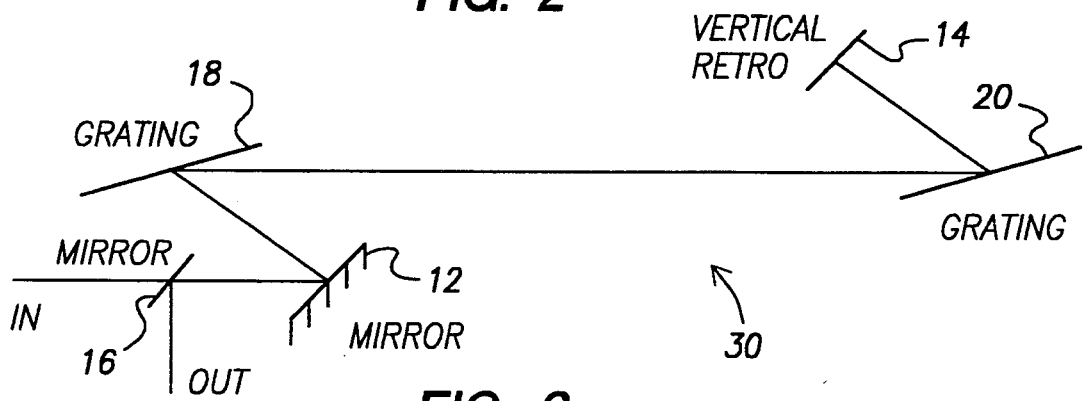
FIG. 3 is a schematic diagram of a two grating pulse compressor of the prior art.
Figure 4:
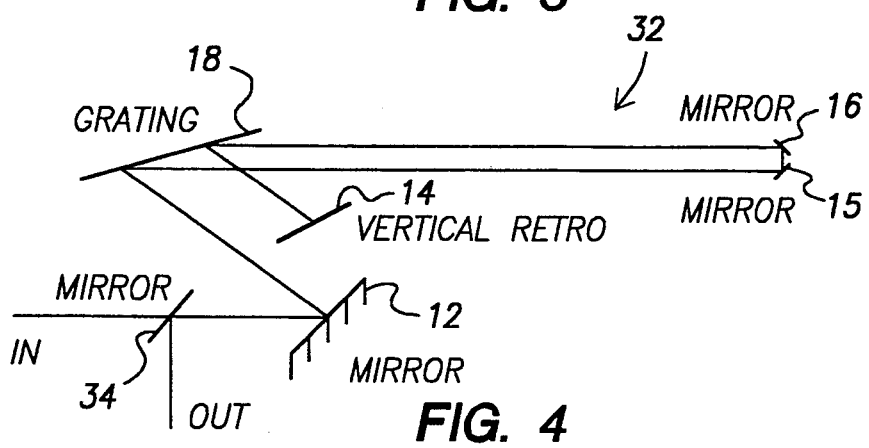
FIG. 4 is a schematic diagram of a single grating pulse compressor of the prior art.
Figure 5:
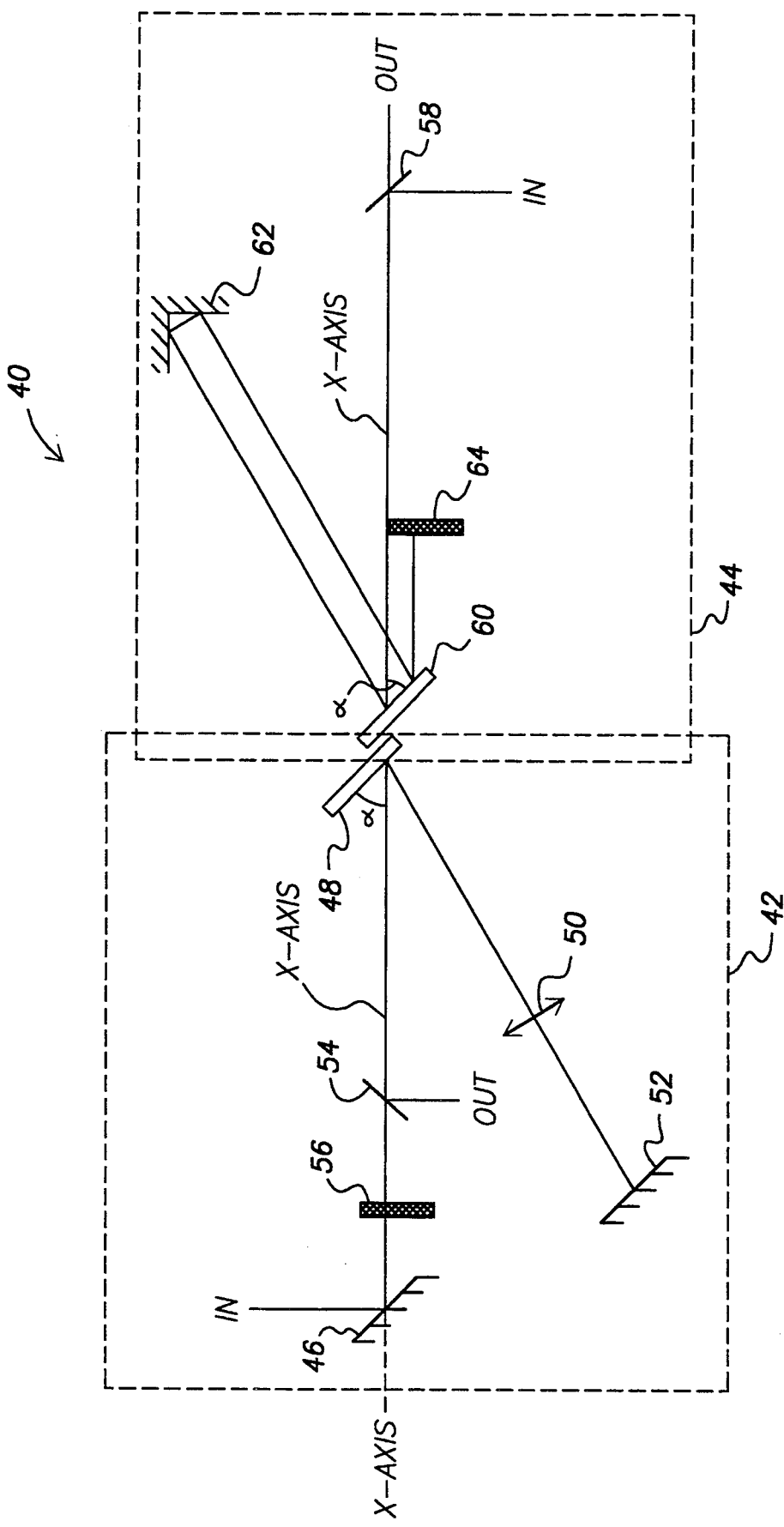
FIG. 5 is a schematic diagram of a preferred embodiment for the pulse stretcher and compressor of the present invention.

Referring now to FIG. 5, a schematic diagram of the preferred embodiment of a stretcher and compressor 40 constructed in accordance with the present invention will be described. The stretcher and compressor 40 of the present invention preferably comprises a stretcher portion 42 and a compressor portion 44. Each portion 42, 44 has its own input and output, however, the stretcher portion 42 and the compressor portion 44 are precisely aligned with each other for proper operation as a CPA. The stretcher portion 42 and the compressor portion 44 are positioned such that the adjustment of a single parameter is all that is necessary to align both the stretcher portion 42 and the compressor portion 44 with their respective input beams.

As best shown in FIG. 5, the stretcher portion 42 includes a first mirror 46, a first diffraction grating 48, a first lens 50, a second mirror 52, a third mirror 54 and a first vertical retroreflector 56. The stretcher portion 42 preferably uses only a single grating to stretch the pulse. The input to the stretcher portion 42 is received by first mirror 46 and reflected along the X-axis of the stretcher and compressor 40 to the first grating 48. It should be understood that the first mirror 46 is optional, and that the beam could be input directly to the first grating 48 along the X-axis. The first mirror 46 is preferably positioned a predetermined distance from the first grating 48. For example, the first mirror 46 may be positioned 60 centimeters from the first grating 48. The first grating 48 is preferably mounted on a rotatable block 70, as described below, so that the input angle ($a$) of the beam to the first grating 48 may be adjusted. The diffraction gratings diffract different wavelength components through different angles; sending each different component along a slightly different path through the stretcher or compressor. The second mirror 52 is positioned a predetermined distance away from the first grating 48 generally in the direction of the first mirror 46. For example, the second mirror 52 must be positioned one focal length away from the lens at angle of 90 degrees relative to the beam coming from the grating 48. From the grating 48, the beam is directed toward the second mirror 52, and then reflected back to the first grating 48. The first lens 50 is preferably disposed in the optical path between the first grating 48 and the second mirror 52 such that the beam passes through the lens 50. The two remaining components of the stretcher portion 42 are the third mirror 54 and the first vertical retroreflector 56. The third mirror 54 and the first vertical retroreflector 56 are positioned along the X-axis between the first mirror 46 and the first grating 48. The first vertical retroreflector 56 is positioned to receive an optical beam from the first grating 48 and send a return beam with a parallel path but offset vertically. The first vertical retroreflector 56 accomplishes this with a pair of mirrors mounted at a right angle. Those skilled in the art will realize that the retroreflector 56 could also be a single mirror slightly tilted upwards or downwards and with the positions of the other components modified. The first vertical retroreflector 56 is preferably positioned between the first mirror 46 and the first grating 48 proximate the first mirror 46. The third mirror 54 is positioned between first vertical retroreflector 56 and the first grating 48. The third mirror 54 is optically coupled to the first grating 48 to output an out of the plane beam away from the X-axis. Finally, it should be noted that the first mirror 46, first grating 48, first lens 50, second mirror 52, third mirror 54 and first vertical retroreflector 56 can be conventional components used to affect optical beams.

Figure 7:
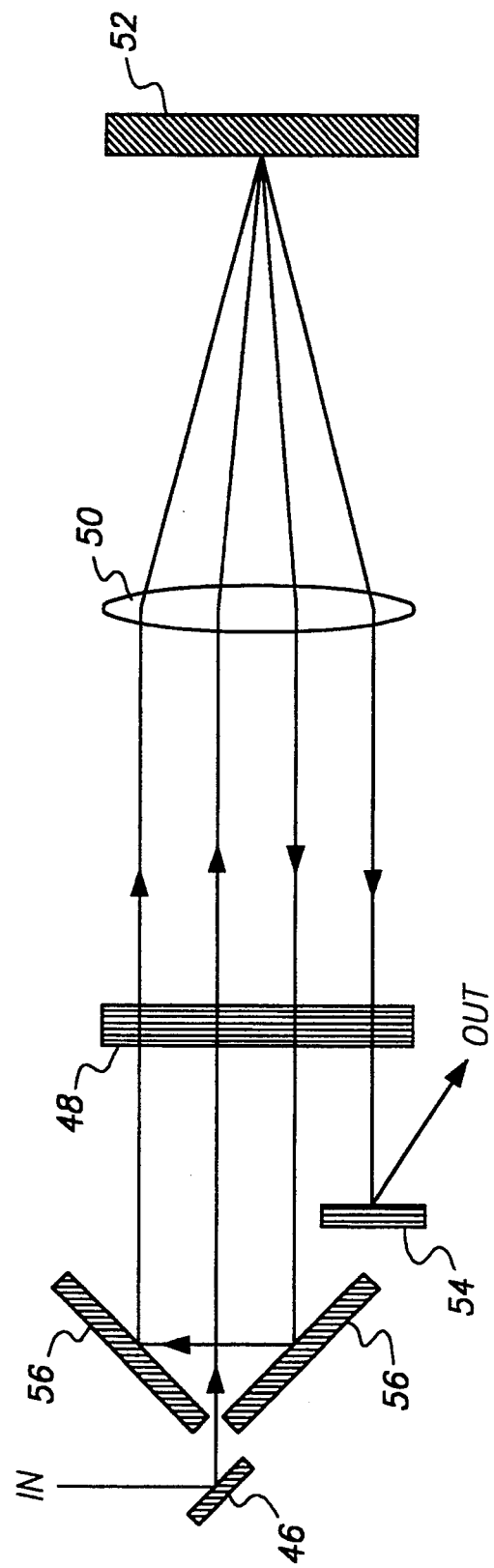
FIG. 7 is a side view diagram of the optical path for the pulse stretcher portion of the present invention.

Referring now to FIG. 7, the vertical path of the laser beam through the stretcher portion 42 is shown. The beam is input to the first mirror 46 and reflected towards the first grating 48. The beam is then diffracted by the first grating 48 through the first lens 50 to the second mirror 52. While the beam is shown as passing through first grating 48, the beam is in fact diffracted by the grating 48. The beam is only shown as passing through the first grating 48 for ease of understanding. The beam is reflected by the second mirror 52 back through lens 50 to the first grating 48. The first grating 48 sends the beam toward a first mirror of the first vertical retroreflector 56. The beam is reflected by both mirrors of the first vertical retroreflector 56 back along a path parallel but vertically offset from the entry beam to the first grating 48. The first grating 48 then diffracts the beam a third time through the lens 50 to the mirror 52. Finally, the beam is reflected back through the lens 50 by the second mirror 52, and by the first grating 48 to the third or pick off mirror 54 as the output. FIG. 7 illustrates the vertical spacing differences in the placement of the first mirror 46, the first vertical retroreflector 56, and the third mirror 54.

Referring back to FIG. 5, the preferred embodiment for the compressor portion 44 will be described. The compressor portion 44 preferably includes a fourth mirror 58, a second grating 60, a horizontal retroreflector 62 and a second vertical retroreflector 64. The second grating 60 is preferably positioned on the same mounting block 70 as the first grating 48. The second diffraction grating 60 is preferably mounted in a position parallel to the first grating 48, with the second diffraction grating 60 and the first grating 48 facing in opposite directions. This can be achieved by means of a very simple alignment procedure, external to the stretcher and compressor. The fourth mirror 58 is preferably positioned on the X-axis in a position distal the second diffraction grating 60. The fourth mirror 58 is positioned such that the input beam is reflected to the second diffraction grating 60 along the X-axis in a direction opposite to the input to the first grating 48. It should be noted that the fourth mirror 58 is optional, and the beam could be input directly to the second grating 60. The input angle ($\beta$) to the second diffraction grating 60 is advantageously the same as the input angle ($\alpha$) to the first grating 48 because of the position of the input beams and the parallel positioning of the first grating 48 and the second diffraction grating 60. The horizontal retroreflector 62 is positioned a predetermined distance away from the first grating 48, generally in the direction of the fourth mirror 58. For example, the horizontal retroreflector 62 may be positioned 50 cm at angle of 15 degrees from the X-axis. The beam is directed toward the horizontal retroreflector 62 and then reflected back along a parallel but opposing path to the second grating 60 by the two mirrors of the horizontal retroreflector 62. The final component of the compressor portion 44 is the second vertical retroreflector 64. The second vertical retroreflector 64 is positioned proximate the X-axis to receive a beam from the second diffraction grating 60 since the beams to and from the second vertical retroreflector 64 are parallel to the X-axis. The second vertical retroreflector 64 is preferably positioned about midway between the second diffraction grating 60 and the fourth mirror 58. Like the first vertical retroreflector 56, the second vertical retroreflector 64 is positioned to receive an optical beam from the second diffraction grating 60 and send a return beam with a parallel path but vertically offset. The second vertical retroreflector 64 includes a pair of mirrors mounted at a right angle for this purpose. The fourth mirror 58, second grating 60, horizontal retroreflector 62 and second vertical retroreflector 64 are constructed using conventional optical components as will be understood to those skilled in the art.

Figure 8A:
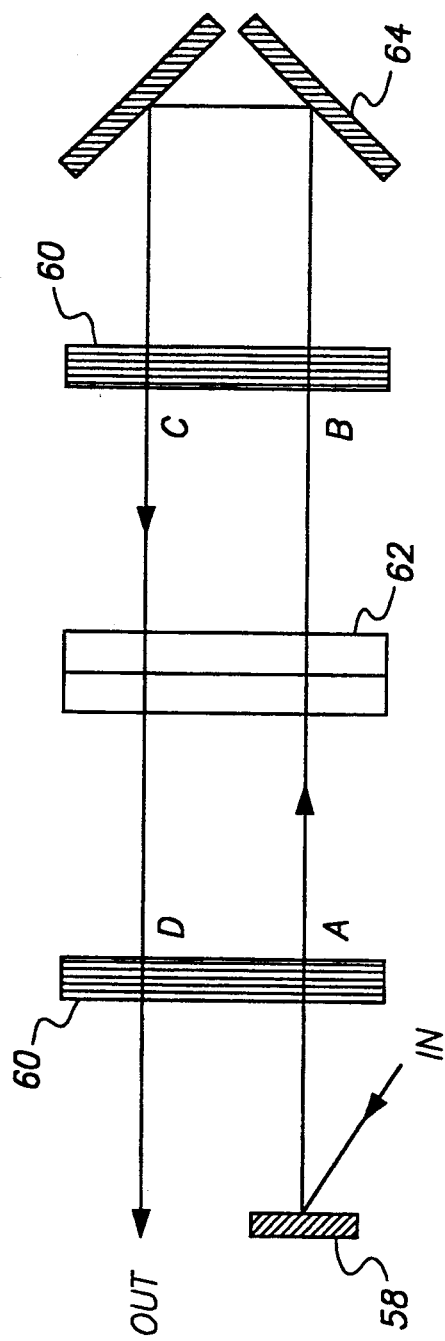
FIG. 8a and 8b are a side view diagram of the optical path for the pulse compressor portion of the present invention.
Figure 8B:
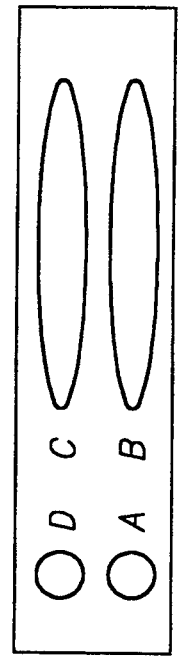

Referring now to FIGS. 8a and 8b, the vertical path of the laser beam through the compressor portion 44 is shown. For ease of understanding, the second grating 60 is shown graphically as two parts with the beam passing through the second grating 60. The beam is actually diffracted by the second grating 60 where the beam path is shown in FIGS. 8a and 8b as passing through the grating 60. Only a single grating forms the second grating 60 in the preferred embodiment, and the second grating 60 is only represented by the two parts for ease of understanding. The beam is input into the compressor 44 and reflected along the X-axis by the fourth mirror 58. The beam is then diffracted by the second diffraction grating 60 toward the horizontal retroreflector 62. The horizontal retroreflector 62 shifts the beam horizontally and sends a parallel beam back to the second diffraction grating 60 (as best shown in FIG. 5). The second diffraction grating 60 then diffracts the return beam to the second vertical retroreflector 64. The second vertical retroreflector 64 returns a beam on a parallel path elevated above the input path as best shown in FIGS. 8a and 8b. Both retroreflectors 62, 64 use a pair of mirrors positioned at right angles to provide return paths parallel but opposite in direction to the input beam. The beam is then diffracted by the second diffraction grating 60 toward the horizontal retroreflector 62 which again horizontally shifts the beam but back to its original horizontal position. From the horizontal retroreflector 62, the beam is sent to the second diffraction grating 60 and the diffracted to the output.

Figure 6:
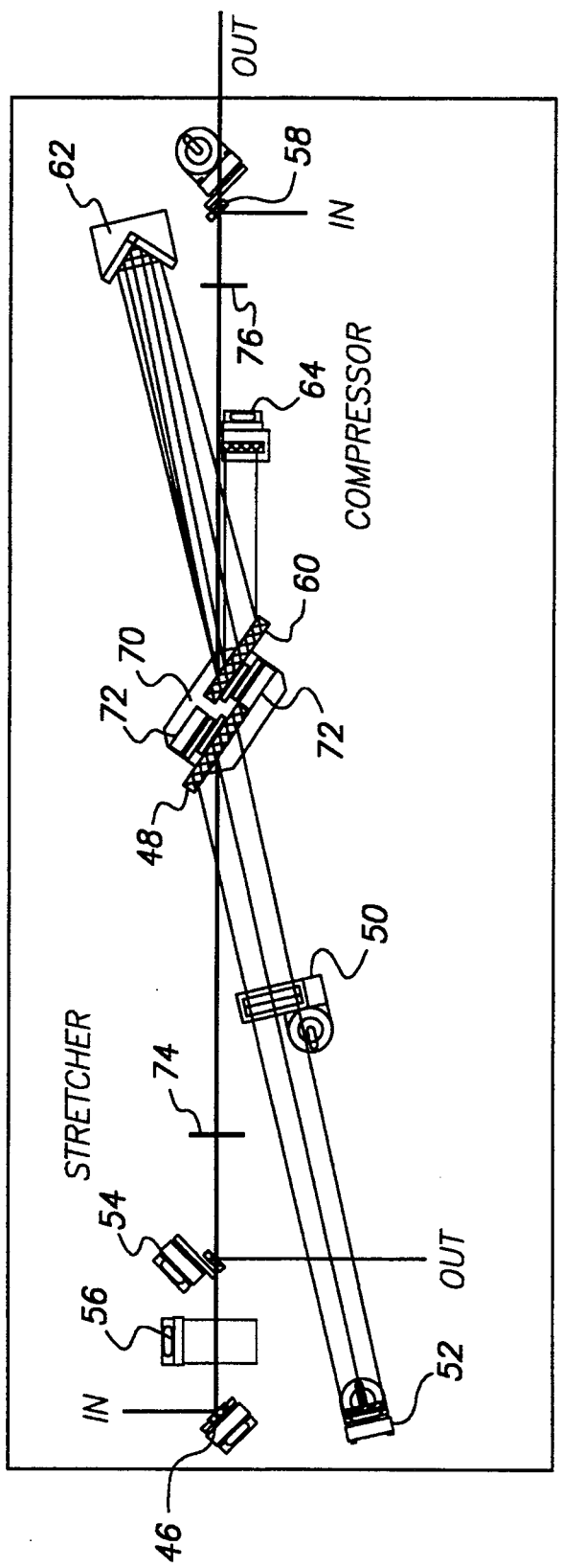
FIG. 6 is a top plan view of the preferred embodiment of the pulse stretcher and compressor of the present invention.

FIG. 6 illustrates a top plan view of the preferred embodiment for the stretcher and compressor 40 of the present invention. As shown in FIG. 6, the first grating 48 and the second diffraction grating 60 are mounted on top of the rotatable mounting block 70. The first grating 48 and the second diffraction grating 60 are preferably mounted in parallel planes with the front of each facing in opposite directions. The first grating 48 and the second diffraction grating 60 are slightly offset with just a portion of the gratings 48, 60 overlapping the X-axis. The gratings are preferably firmly attached to the rotatable mounting block 70 by fastening means 72. The fastening means are preferably yaw and pitch mirror mounts conventional in the art.

The top view of FIG. 6 also illustrates the alignment of the input to the stretcher portion 42 and the input to the compressor portion 44. As shown in FIG. 6, the input to the first grating 48 is along the X-axis as is the input to the second diffraction grating 60. In the preferred embodiment, the axis of the input beams is preferably collinear. The present invention preferably provides a first and second alignment means 74, 76 to ensure that the input beams to the gratings 48, 60 are collinear. The first and second alignment means 74, 76 are removable and not used during the normal operation of the stretcher and compressor 40. The first and second alignment means 74, 76 preferably each comprise an member defining an alignment hole through which the beam may pass. The first alignment means 74 is preferably positioned between the first mirror 46 and the first grating 48 or mounting block 70 for alignment purposes. The second alignment means 76 is preferably positioned between the second diffraction grating 60 or mounting block 70 and the fourth mirror 58. Once the alignment means 74, 76 are positioned, the input beam to the stretcher portion 42 is adjusted so that the input beam passes through the holes in both alignment means 74, 76. Similarly, the input beam to the compressor portion 44 is adjusted so that its input beam passes through the holes in both alignment means 74, 76. This ensures that the input beams to both gratings 48, 60 are collinear. Those skilled in the art will realize that this configuration for the alignment means 74, 76 may be modified to ensure that the beams are parallel.

The present invention also includes a preferred method for simultaneously aligning the input angle of tile stretcher portion 42 and the input angle of the compressor portion 44 of the present invention for proper operation as a CPA. The preferred method begins alignment by removing the first and second diffraction gratings 48, 60. Then, the alignment means 74, 76 are positioned between the first mirror 46 and the first grating 48, and the second diffraction grating 60 and the fourth mirror 58, respectively. Once the alignment means 74, 76 are in place, the input beam for the stretcher portion 42 is aligned such that it passes through a first and second alignment holes. Next, the input beam for the compressor portion is aligned such that it passes through the first and second alignment holes. The alignment means 74, 76 are then removed, and the gratings 48, 60 are positioned on the mounting block 70 in parallel planes. The mounting block 70 is then rotated until the proper input angle for the laser wavelength is reached. The position of the diffraction gratings 48, 60 can be further fine tuned using controls on the mounting block 70.

Figure 9:
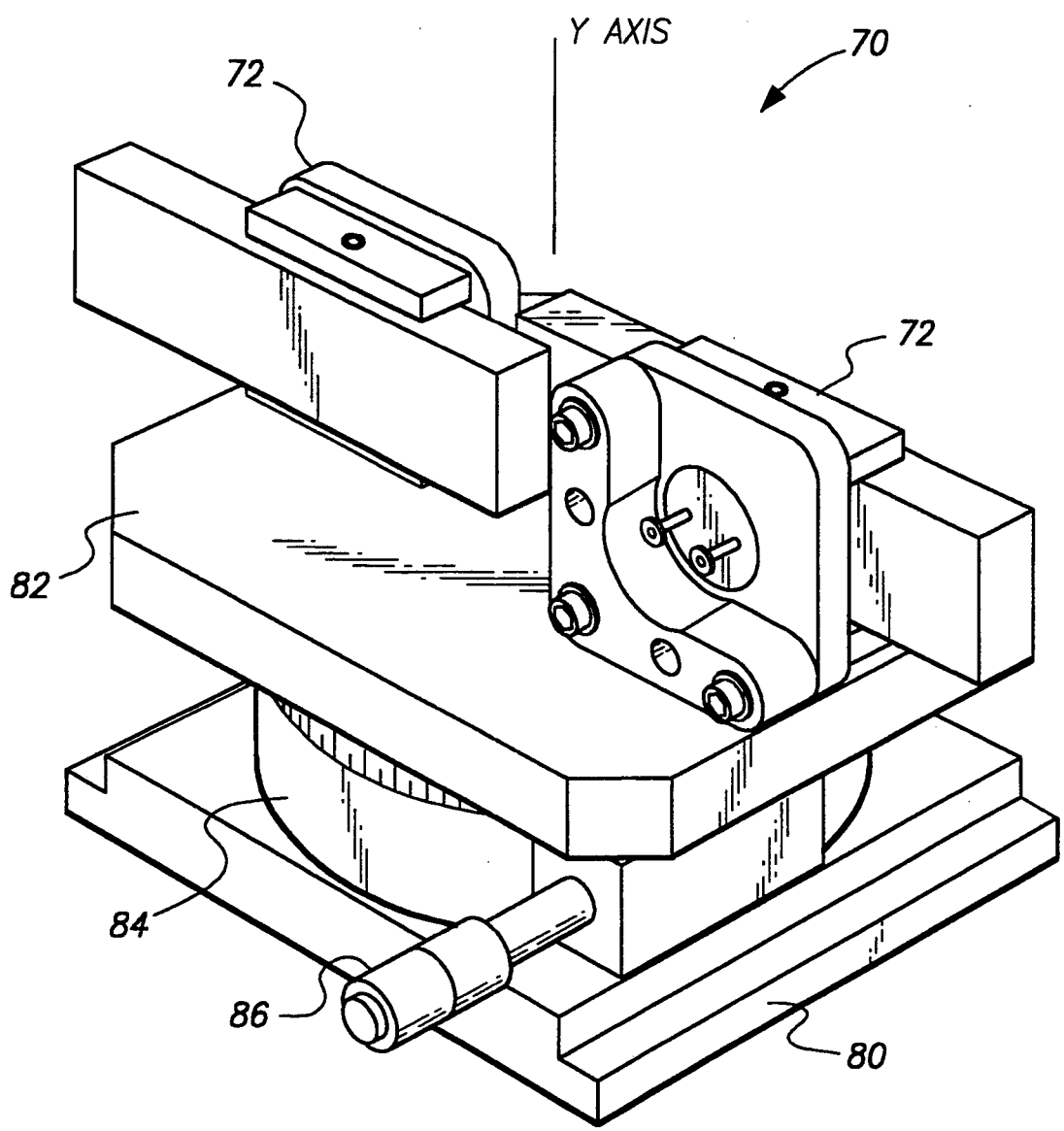
FIG. 9 is a perspective view of the preferred embodiment for the mounting block of the present invention.

Referring now to FIG. 9, the preferred embodiment for the rotatable mounting block 70 is shown. The rotatable mounting block 70 preferably comprises a base 80, a rotatable top 82, an adjustment means 84, a fine tuning means 86, and fastening means 72. The rotatable top 82 is coupled to the base 80 by the adjustment means 84 and the fine tuning means 86. The adjustment means 84 provides for rotation of the rotatable top 82 with respect to the base 80 about a Y-axis. The rotatable top 82 may be generally moved to the desired position by applying rotation forces directly to the rotatable top 82. Once generally in the position desired, the gratings 48, 60 may be precisely aligned by turning the fine tuning means 86 which cause very minor rotations of the rotatable top 82. The gratings 48, 60 are preferably mounted to the rotatable top 82 using the fastening means 72. The fastening means 72 are preferably mounted spaced apart along parallel planes. The fastening means 72 each have one end securely mounted to the top surface of the rotatable top 82. The fastening means also provide a slot for receiving and holding the gratings 48, 60.

While the present invention has been described with reference to certain preferred embodiments, those skilled in the art will recognize that various modifications may be provided. For example, there may be other embodiments for the stretcher and compressor in addition to those described with reference to FIGS. 5–9. For example, the inputs to the stretcher and compressor may be parallel rather than collinear with the grating being mounted in parallel planes on separate mounting blocks. These and other variations upon and modifications to the preferred embodiment are provided for by the present invention which is limited only by the following claims.

What is claimed is:

1. A laser pulse stretcher and compressor comprising:
   a stretcher portion having a first diffraction grating for receiving a laser pulse and stretching the pulse, the stretcher portion receiving a first input beam to the stretcher portion along a first axis, the first diffraction grating positioned for receiving the first input beam with an input side of the first diffraction grating; and
   a compressor portion having a second diffraction grating for receiving a laser pulse and compressing the pulse, the compressor portion receiving a second input beam along a second axis, the second axis parallel to the first axis, the second diffraction grating positioned for receiving the second input beam with an input side of the second diffraction grating, and the second diffraction grating being positioned in a plane parallel to a plane in which the first diffraction grating is positioned.

2. A laser pulse stretcher and compressor comprising:
   a stretcher portion having a first diffraction grating for receiving a laser pulse and stretching the pulse, the stretcher portion receiving a first input beam to the stretcher portion along a first axis, the first diffraction grating positioned for receiving the first input beam with an input side of the first diffraction grating; and
   a compressor portion having a second diffraction grating for receiving a laser pulse and compressing the pulse, the compressor portion receiving a second input beam along a second axis, the first axis being collinear with the second axis, the second diffraction grating positioned for receiving the second input beam with an input side of the second diffraction grating, and the second diffraction grating being positioned in a plane parallel to a plane in which the first diffraction grating is positioned.

3. A laser pulse stretcher and compressor comprising:
   a stretcher portion having a first diffraction grating for receiving a laser pulse and stretching the pulse, the stretcher portion receiving a first input beam to the stretcher portion along a first axis, the first diffraction grating positioned for receiving the first input beam with an input side of the first diffraction grating;
   a compressor portion having a second diffraction grating for receiving a laser pulse and compressing the pulse, the compressor portion receiving a second input beam along a second axis, the second axis parallel to the first axis, the second diffraction grating positioned for receiving the second input beam with an input side of the second diffraction grating; and
   wherein the first diffraction grating and the second diffraction grating are mounted in parallel planes to a rotatable block for providing single parameter alignment of input angles to the first and second diffraction gratings by rotation of the block.

4. A laser pulse stretcher and compressor comprising:
- a stretcher portion having a first diffraction grating, a first mirror, a lens and a retroreflector for receiving a laser pulse and stretching the pulse, the stretcher portion receiving a first input beam to the stretcher portion along a first axis, the first diffraction grating positioned for receiving the first input beam with an input side of the first diffraction grating; the first mirror optically coupled to the first diffraction grating for receiving and transmitting an optical beam; the lens positioned between the first mirror and the first diffraction grating, said lens optically coupling the first diffraction grating and the first mirror, and the retroreflector positioned along the first axis, the retroreflector optically coupled to the first diffraction grating for receiving an optical beam and transmitting the beam back to the diffraction grating along a parallel path; and
- a compressor portion having a second diffraction grating for receiving a laser pulse and compressing the pulse, the compressor portion receiving a second input beam along a second axis, the second axis parallel to the first axis, the second diffraction grating positioned for receiving the second input beam with an input side of the second diffraction grating, and the second diffraction grating being positioned in a plane parallel to a plane in which the first diffraction grating is positioned.

5. The apparatus of claim 4, wherein the first mirror is positioned one focal length away from the lens at an angle of about 90 degrees relative to the beam received from the first grating.

6. The apparatus of claim 4, wherein the retroreflector comprises a second mirror and a third mirror, the second mirror and the third mirror positioned in planes at a right angle to each other.

7. The apparatus of claim 4, wherein the retroreflector comprises a single mirror, slightly tiled downwards.

8. A laser pulse stretcher and compressor comprising:
- a stretcher portion having a first diffraction grating for receiving a laser pulse and stretching the pulse, the stretcher receiving a first input beam to the stretcher portion along a first axis, the first diffraction grating positioned for receiving the first input beam with an input side of the first diffraction grating; and
- a compressor portion having a second diffraction grating, a horizontal retroreflector, and a vertical retroreflector for receiving a laser pulse and compressing the pulse, the compressor portion receiving a second input beam along a second axis, the second axis parallel to the first axis, the second diffraction grating positioned for receiving the second input beam with an input side of the second diffraction grating, and the second diffraction grating being positioned in a plane parallel to a plane in which the first diffraction grating is positioned, the horizontal retroreflector positioned to receive an optical beam from the second grating, the horizontal retroreflector optically coupled to the second diffraction grating to receive an optical beam and transmit the beam back to the second diffraction grating along a parallel path shifted in the horizontal direction, and the vertical retroreflector positioned to receive an optical beam from the second grating, the vertical retroreflector optically coupled to the second diffraction grating to receive an optical beam and transmit the beam back to the second diffraction grating along a parallel path shifted in the vertical direction.

9. The apparatus of claim 8, wherein the vertical and horizontal retroreflectors each comprises a first mirror and a second mirror, the first mirror and the second mirror positioned in planes at a right angle to each other.

10. A laser pulse stretcher and compressor comprising:
- a rotatable block;
- a stretcher portion having a first diffraction grating for receiving a laser pulse and stretching the pulse, the stretcher portion receiving a first input beam to the stretcher portion at a first angle, the first diffraction grating positioned for receiving the first input beam with an input side of the first diffraction grating, the first angle measured between a first axis and the input side of the first diffraction grating, the first diffraction grating mounted on the rotatable block; and
- a compressor portion having a second diffraction grating for receiving a laser pulse and compressing the pulse, the compressor portion receiving a second input beam at a second angle, the second diffraction grating positioned for receiving the second input beam with an input side of the second diffraction grating, the second angle measured between a second axis and the input side of the second diffraction grating, the second diffraction grating mounted on the rotatable block, the second diffraction grating positioned relative to the first diffraction grating such that the second angle is equal to the first angle and a change in the first angle resulting from a displacement in the position of the first diffraction grating caused by rotation of the rotatable block results in an identical change in the second angle.

* * * * *